United States Patent
Tarantino (10) Patent No.: US 8,897,746 B1
(45) Date of Patent: Nov. 25, 2014

(54) METHOD AND SYSTEM FOR SYNCHRONIZING PRE-PAID ACCOUNT BALANCE INFORMATION BETWEEN A NETWORK BASED SERVER AND A MOBILE STATION

(75) Inventor: Roy D. Tarantino, South River, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1142 days.

(21) Appl. No.: 12/191,052

(22) Filed: Aug. 13, 2008

(51) Int. Cl.
*H04M 11/00* (2006.01)
*H04W 4/00* (2009.01)

(52) U.S. Cl.
USPC ............ 455/406; 455/407; 455/408; 455/466

(58) Field of Classification Search
USPC ............... 455/405–408, 466, 432.1; 379/111, 379/114.03, 114.15, 121.01, 122, 127.03; 705/52, 7.19, 7.21, 7.35, 14.15, 335, 705/40
See application file for complete search history.

(56) References Cited

U.S. PATENT DOCUMENTS

| | | | |
|---|---|---|---|
| 6,304,948 B1* | 10/2001 | Motoyama et al. ........... 711/162 | |
| 6,678,258 B1* | 1/2004 | Capurka et al. ............... 370/328 | |
| 6,990,330 B2* | 1/2006 | Veerepalli et al. ............ 455/406 | |
| 2002/0111153 A1* | 8/2002 | Hartmaier et al. ............ 455/406 | |
| 2003/0157925 A1* | 8/2003 | Sorber et al. .................. 455/406 | |
| 2004/0077332 A1 | 4/2004 | Ephraim et al. | |
| 2004/0137874 A1 | 7/2004 | Veerepalli et al. | |
| 2005/0113073 A1 | 5/2005 | Bayne | |
| 2007/0021101 A1 | 1/2007 | McCann et al. | |
| 2007/0043676 A1 | 2/2007 | Gao et al. | |
| 2007/0230680 A1 | 10/2007 | McCann | |
| 2007/0242816 A1 | 10/2007 | Cai et al. | |
| 2007/0254629 A1 | 11/2007 | Black et al. | |
| 2007/0286367 A1 | 12/2007 | McCann et al. | |
| 2008/0039050 A1* | 2/2008 | Black et al. ................... 455/406 | |
| 2008/0254764 A1* | 10/2008 | Linquist et al. ............... 455/406 | |

* cited by examiner

Primary Examiner — San Htun (57) ABSTRACT

Prepaid account balance of a mobile station user on the mobile station is synchronized with a prepaid account balance stored in a prepaid server. The mobile station receives messages indicating the prepaid account balance generated by the prepaid server via a communication link established by a wireless network system. The prepaid server determines elapsed time since the last message regarding the prepaid account and sends a new message indicating the prepaid account balance to the mobile station if a predetermined time has elapsed. The prepaid server's operations may be performed periodically by the prepaid server or performed when the mobile station is powered on from power off state or the mobile station to a service coverage area from a non-service coverage area. The new message showing the prepaid account balance is displayed on the mobile station upon receiving the new message.

21 Claims, 5 Drawing Sheets

METHOD AND SYSTEM FOR SYNCHRONIZING PRE-PAID ACCOUNT BALANCE INFORMATION BETWEEN A NETWORK BASED SERVER AND A MOBILE STATION

FIELD OF THE INVENTION

The present subject matter relates to a method and a system for synchronizing prepaid account balance information between a prepaid server and a mobile station.

BACKGROUND

Charging in wireless networks has traditionally been either postpaid or prepaid. Postpaid charging refers to the type of charging in which a subscriber uses a service prior to paying for the service. For example, a subscriber may enter into a contract with a service provider specifying what the subscriber will be billed for the service. As the subscriber places or receives calls over the network, an administrator server or the like collects call information during each call and generates a call detail record for the call. The call detail record includes information such as the calling party, the called party, the duration of call, etc. The call detail records are collected by a billing system of the service provider that aggregates the call detail records for a billing cycle. At the end of the billing cycle, the service provider sends out a bill to the subscriber that specifies the usage by the subscriber during the billing cycle.

Prepaid charging refers to the type of charging in which a subscriber purchases the service prior to use and the balance paid for by the subscriber is depleted based on the usage by the subscriber. For example, a subscriber may purchase five hundred hours of airtime in a prepaid wireless plan. As the subscriber places or receives calls over the wireless network, an administrative server or the like in the network monitors the usage by the subscriber in real-time and decrements the account of the subscriber accordingly. If the subscriber's account runs low or runs out, then the subscriber needs to recharge the account before further usage will be granted by the network.

As the prepaid airtime subscriber uses a mobile terminal during active mode (when a voice or data call is established or when SMS or MMS messages are sent or received), the balance of remaining available airtime diminishes from the initial prepaid subscription. Unless the user has kept track of the minutes used, and knows the tariff or roaming charges, the user must rely on the service provider to inform him of the remaining balance. To learn the remaining balance of a prepaid subscription, a balance query is initiated by the user while the mobile terminal is not in the active mode or the mobile service provider sends text or voice messages to the mobile terminal with the balance information whenever an event affecting the balance occurs.

However, while the mobile terminal user desires to know the exact and detailed remaining balance to manage his or her mobile service account, such a user-initiated notification or service provider's notification by text or voice messages often cannot reflect the exact remaining balance in real time. The user-initiated balance notification cannot provide the mobile station with the real time balance when the user does not request information of the remaining balance after every balance affecting event occurs. In addition, a service provider's notification cannot provide real time balance to the mobile station when the mobile station is powered off or moves out of the coverage area for some period.

As a way to provide the real time balance to the mobile terminal user, some platforms send Short Message Service (SMS) messages including the remaining balance and/or expiration date to the mobile terminal for display, whenever an event affecting the balance occurs. When the mobile terminal receives such an SMS message, the balance is updated and displayed on a display of the mobile terminal as to permit the user to know the balance and the expiration date in real time. This notification scheme based on the SMS messages works well as long as the mobile terminal is powered on and ready to receive the SMS messages at the appropriate time. However, if the balance affecting event occurs while the mobile terminal is powered off, if the mobile terminal is not in the coverage area, or if the mobile terminal remains powered off or out of range longer than the period for which the network retains the SMS message before the messages are discarded, then the remaining balance displayed on the mobile terminal does not accord with the remaining balance stored in the network.

Hence, a need exists for a technique for synchronizing prepaid account balance of the mobile station with the prepaid account balance stored in the prepaid server.

SUMMARY

The teachings herein address one or more of the above noted needs relating to a method and a system for synchronizing prepaid account balance information between a prepaid server and a mobile station.

The teachings below encompass a method for synchronizing prepaid account balance of a mobile station user on the mobile station with a prepaid account balance stored in a prepaid server. The server sends a message intended for the mobile station, indicating the prepaid account balance generated by the prepaid server via a communication link established by a wireless network system. The prepaid server determines an amount of time which has elapsed since the last message indicating the prepaid account balance was generated by the prepaid server, and the server sends a new message indicating the prepaid account balance to the mobile station, when a predetermined time has elapsed after the last message indicating the prepaid account balance was generated by the prepaid server.

The previous steps may be performed periodically by the prepaid server or performed when the mobile station is powered on from power off state or when the mobile station returns to a service coverage area from a non-service coverage area.

In a practical example, the new message showing the prepaid account balance can be displayed on the mobile station upon receiving the new message.

Typically, the last message indicating the prepaid account balance is generated when an event affecting the prepaid account occurs.

Another aspect of the disclosure encompasses a network system for notifying a mobile station of a prepaid account balance of a user of the mobile station. The system comprises at least one network element for establishing a communication link with the mobile station to provide a mobile communication service, and a message service center for generating and sending a message showing a prepaid account balance of the mobile station user to the mobile station via the established communication link with the mobile station. A prepaid server manages prepaid accounts of mobile stations users. The server decides to send a new message showing the prepaid account balance of the mobile station user when a predetermined time has elapsed after the last message indicating the prepaid account balance has been sent to the mobile station.

In a disclosed example, the prepaid server includes a customer database for storing prepaid account data of mobile station users, a message control interface for controlling messages generated at the message center, and a microprocessor. The microprocessor checks how long has elapsed after the last message showing the prepaid account balance at the prepaid server, decides whether a predetermined time has elapsed after the last message indicating the prepaid account balance was generated by the prepaid server, and determines to generate a new message indicating the prepaid account balance of the mobile station user when the predetermined time has elapsed after the last message indicating the prepaid account balance was generated by the prepaid server.

The elapsed time may be checked periodically or may be checked when the mobile station is powered on or returns to a service coverage area from a non-service coverage area.

In a typical network implementation, the message center discards any prepaid account balance message that fails to be sent successfully to the mobile station within the predetermined time. Stated another way, the predetermined time corresponds to the typical message retention time, for undelivered messages, at the message center.

Another aspect of the disclosure encompasses a prepaid server that provides prepaid account balance information to mobile stations. The mobile stations receive messages showing the prepaid account information from a mobile communication service network to which the prepaid server is connected to a communication link. The prepaid server comprises a customer database for storing prepaid account data of the mobile station users, a message control interface for controlling messages showing the prepaid account balance information generated at the mobile communication service network, and a microprocessor. In operation, the microprocessor checks how long has elapsed since the time of the last transmission of a message indicating the prepaid account balance for one of the user's account generated at the prepaid server, decides whether a predetermined time has elapsed since the last message indicating the prepaid account balance was generated by the prepaid server, and determines to generate a new message indicating the prepaid account balance for the one user's account when the predetermined time has elapsed since the last message indicating the prepaid account balance was generated by the prepaid server. The new message is sent to the one user's mobile station.

The exemplary prepaid server discussed in the detailed description manages debiting and crediting of the prepaid account for each of the mobile stations when a predetermined event affecting the prepaid account arises. The prepaid server decides to generate a message showing the prepaid account balance information when the predetermined event arises.

Another aspect of the disclosure encompasses a processor-readable medium tangibly embodying a set of processor-executable instructions. The execution of the instructions causes a processor to check retention time of a message showing a prepaid account balance of a mobile station. The prepaid account balance represents an available account balance to be used by the mobile station and the message is sent to the mobile station via a wireless communication network. The execution of the instructions further causes the server processor to decide whether a predetermined time has elapsed after the last message indicating the prepaid account balance was generated by the prepaid server, and to decide to generate a new message indicating the prepaid account balance of the mobile station user when the predetermined time has elapsed after the last message indicating the prepaid account balance was generated by the prepaid server (e.g. when retention time for the last message has expired).

BRIEF DESCRIPTION OF THE DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various technologies disclosed in the examples below provide a technique for synchronizing prepaid account balance of a mobile station user on the mobile station with a prepaid account balance stored in a prepaid server. The mobile station may receive a message showing the prepaid account balance generated by the prepaid server via a communication link established by a wireless network system. The prepaid server determines how long a period of time has been elapsed after the last message regarding the prepaid account balance was generated and sent by the prepaid server; and the server sends a new message indicating the prepaid account balance to the mobile station if a predetermined time has elapsed after the last message regarding the prepaid account balance was generated by the prepaid server.

The prepaid server manages debiting and crediting of the prepaid account for each of the mobile stations when a predetermined event affecting the prepaid account arises. The prepaid server decides to generate a message showing the prepaid account balance information when the predetermined event arises.

Figure 1:
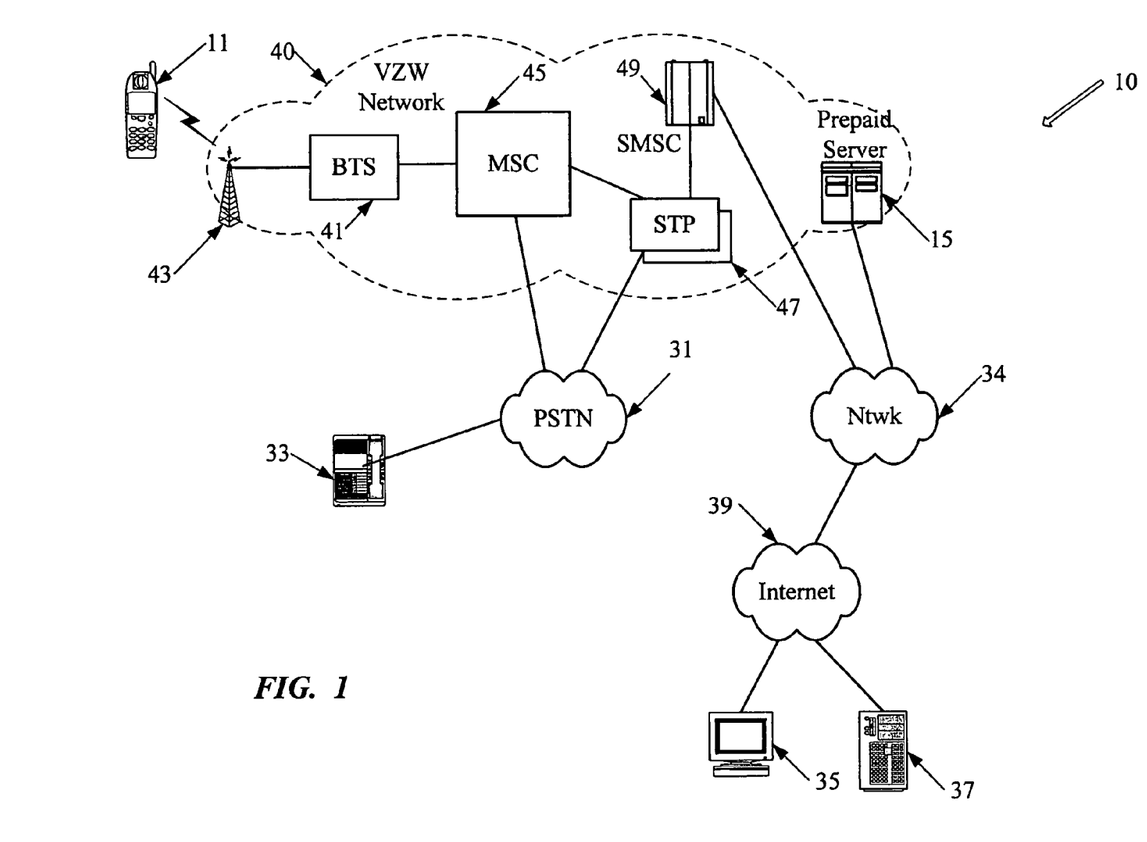
FIG. 1 is a functional block diagram of a system, including mobile wireless communication networks, where the wireless networks offer voice telephone services and SMS message services and may utilize the prepaid processing techniques.

FIG. 1 is a functional block diagram of a system 10, including one or more mobile wireless communication networks (40 in the example) and other connected networks (31, 34 and 39 in the example), where the wireless networks offer voice telephone services and SMS message services and may utilize the prepaid processing techniques outlined above. Other services may be offered, but discussion here covers voice and SMS for convenience.

The communication system 10 provides mobile voice telephone communications for numerous mobile stations 11, one of which is shown in the drawing for ease of illustration. The mobile station 11 represents the general class of mobile stations that operate via public cellular network or the like. The system 10 enables users of the mobile station 11 to initiate and receive telephone calls to each other as well as through the Public Switched Telephone Network (PSTN) 31, for example for communications with landline telephone devices 33. The system 10 also offers a variety of other services, such as various text, data and multimedia services. Because the exemplary balance synchronization utilizes short message service (SMS) communications, the illustrated system 10 also supports SMS type messaging services, as discussed later. Although similar mobile stations may be used for post pay type services, further discussion here will assume that the mobile station 11 is that of a prepaid subscriber.

Many of the services offered through the system 10 are offered on a traditional postpaid basis. However, some services are offered on a prepaid basis. For example, a subscriber may purchase 1000 minutes of phone call air time and/or some number of message units for SMS services. A carrier or a third party service provider will operate a server 15, to support offering of various services on a prepaid basis. The prepaid server manages customers' prepaid accounts.

The mobile stations 11 may take many forms. For example, some mobile stations may be enhanced mobile telephone stations with display and user input capabilities to support certain text and image communications, for example, for e-mail and web browsing applications, and SMS service for purposes of this discussion. Today, such enhanced mobile telephones typically take the form of portable handsets, although they may be implemented in other form factors. Other mobile stations may comprise portable digital assistants (PDAs) with built-in wireless communication capabilities and possibly a voice interface. As another alternative, a wireless device such as network interface card or even a mobile telephone having data communication capabilities may be connected to or integrated into a portable computing device, such as a handheld or laptop type computer.

The mobile stations 11 for prepaid service have a software type platform to perform operations related to displaying remaining balance and/or airtime on their displays. The platform is stored in a memory of the mobile station 11 and implemented by a processor included in the mobile stations 11. The details of the platform and their operation with the wireless network system 10 are discussed later.

Physical elements of a radio access network (RAN) 40, operated by one of the other carriers, include a number of base stations represented in the example by the base transceiver systems (BTS) 41, each of which communicates via an antennae system 43 at the site of base station and the air-link with one or more of the mobile stations 11, when the mobile stations are within range. Each base station typically includes a BTS 41 coupled to several antennae mounted on a radio tower within a coverage area often referred to as a "cell." The BTS 41 is the part of the radio network that sends and receives RF signals to/from the mobile stations that the base station currently serves.

A typical current example of the network 40 also includes a number of radio access network switches. The drawing shows one such switch 45. The switches typically are modern versions of mobile switching centers (MSCs) or Mobile Telephone Switching Offices (MTSOs), which support both cellular voice and packet data services. Each MSC switch 45 connects through trunk circuits to a number of the BTS base station transceivers 41, which the respective switch serves and controls. The MSC switches 45 provide voice service switching, for example, for calls between mobile stations 11 via interconnecting trunks and via the PSTN network 31 for calls to and from landline telephones 33.

The BTS 41 at a base station assigns and reassigns channels to the mobile stations 11 that it serves and monitors the signal levels to recommend hand-offs to other base stations. The network 40 typically includes a Base Station Controller (BSC) functionality (not shown) that controls the functions of a number of base stations and helps to manage how calls made by each mobile station are transferred (or "handed-off") from one serving base station to another. Each wireless network equipment vender implements this function differently. Some vendors have a physical entity, which they call a BSC, while other vendors include this functionality as part of their MSC switch 45.

The network 40 also includes one or more Signal Transfer Points (STPs) 47, typically deployed as mated pairs of STPs, coupled to the MSC switching offices 45 of the network and to elements of the PSTN 31 through signaling system no. 7 (SS7) link sets. The STPs 47 also connect through signaling links to similar elements in the network 40. The STPs 47 and the links thereto provide a signaling network 40, for use in managing call traffic through the telecommunications networks.

In addition to links to switches 45 of the networks and offices of the PSTN 31, the STPs 47 provide signaling links to control nodes, such as Service Control Points (not shown) and to other special service components of the network. Of note for purposes of the present discussion, the STPs 47 provide a signaling communication link to an SMSC 49. Although STPs and SS7 links normally carry only signaling, for SMS services, these elements also carry user message traffic to and from the SMSC 49. The SMSC 49 also connects to an Internet Protocol (IP) network 34, for receiving and possibly sending messages in IP packet format.

Wireless carriers originally developed the Short Message Service (SMS) to transmit text messages for display on the mobile stations 11. The SMSC 49 is a standard messaging computer used in cellular networks today to offer SMS services to cellular customers. The SMS messaging service supports exchange of user messages between mobile stations 11 as well as communications of user messages from or to wireline devices, represented generically by the personal computer 35 and the server 37 in the drawing. The SMSC 49 receives IP packet communications containing user messages, such as e-mail, intended for transmission to mobile stations 11. The messages may arrive from mobile stations 11, or the SMSC 49 may receive user messages for SMS relayed from another SMSC 49 or from other sources (35 or 37 in our example) via the Internet 39 and the IP network 34. The SMSC 49 forwards the user messages intended for mobile stations it serves ("inbound" messages) to the intended mobile station 11 via interoffice signaling resources through the STPs 47 and over a signaling channel of the radio access network. In the example, the SMS communication capability is also used to supply balance update messages from the prepaid server 15 to mobile station 11 of prepaid service subscribers.

Different customers subscribe to service through different providers and are assigned to specific Radio Access Networks (RAN's) 40 as their home networks; and the mobile stations and network elements are provisioned accordingly. Those skilled in the art will understand that the system 10 will provide services for many customers through their mobile stations, although for simplicity, only one mobile station 11 is illustrated. For SMS services, for example, SMS customers are assigned or homed to the SMSCs 49. An incoming message intended for delivery to an assigned subscriber's mobile station 11 will be delivered by SMSC assigned to that mobile station 11 via the MSC that is currently serving the mobile station 11. The SMSC 49 receives remaining balance information of each mobile station user's prepaid account and forwards a SMS message including the remaining balance information to a mobile station 11 corresponding the prepaid account. A Multimedia Message Service Center (MMSC), which offers Multimedia Message Service (MMS) messages such as moving pictures, can replace or be installed in addition to the SMSC 49 for sending the remaining balance information to the mobile station 11, while not shown in FIG. 1.

The system 10 will operate a prepaid server 15, to manage customer's prepaid accounts. The server 15 typically does not send or receive user traffic. The server 15 instead sends and receives signaling messages, to and from various network elements, to perform prepaid accounting "transaction" functions and to enable appropriate control of network service operations.

For voice telephone calls, the prepaid server 15 interacts with switches of the networks and/or with network nodes providing Home Location Register (HLR) and/or Visitor Location Register (VLR) functions to provide prepaid accounting and management of account related information for controlling such calls, in a manner well known in the art. In advanced systems such as that shown in FIG. 1, the prepaid server 15 provides a unified prepaid service control for voice calls and for all other types of services offered through the system 11, including Short Message Service (SMS). For prepaid SMS messaging services, the server 15 communicates with one or more of the SMSCs 49.

Typically, the prepaid wireless service customer purchases blocks of time or volumes of data or message units for making voice telephone calls and/or other services through the system 10. The purchase amount is established as the initial balance for the subscriber's account in the prepaid server 15. Upon connection of the prepaid subscriber's mobile station 11 to the wireless communications network 40, the customer account is authorized and authenticated, through signaling to/from the server 15; and the network 40 allows a call or other communication for the mobile station 11 to proceed. The network 40 provides information to the server 15 to allow the server to monitor the customer's usage time or volume and to decrement from the customer's account balance accordingly, in real-time. If the account becomes depleted, the system can either prompt the customer to purchase more time or message units, or the system can terminate any ongoing call or data/message communication. As discussed later, the server 15 also provides one or more messages to the prepaid mobile station 11 indicating current account balances, at various times as the account is depleted and/or replenished by additional purchases. Such messaging synchronizes account information stored in the mobile station with the account balance maintained at the prepaid server 15.

Although special purpose platforms may be used, in the illustrated example, servers such as the prepaid server 15, and the servers that might be used to implement the SMSCs 49 are intended to represent a general class of data processing device commonly used to run "server" programming. Each such device typically runs a general server type program and one or more application programs on top of the server programming, to implement the respective functionality such as the prepaid server functionality shown in FIG. 2. Such a device typically utilizes general purpose computer hardware to perform its respective server processing and to perform the attendant communications via the network(s).

Figure 2:
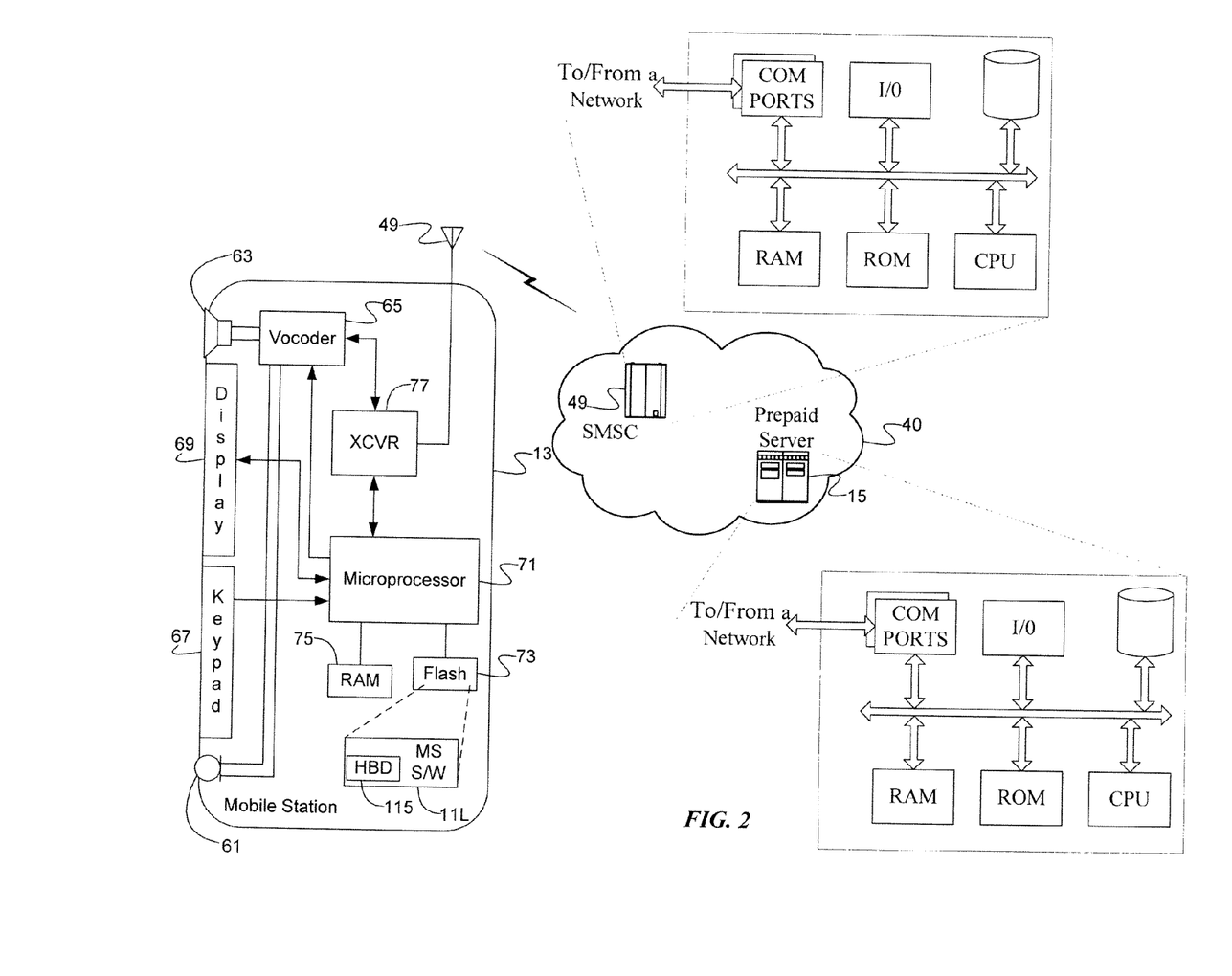
FIG. 2 is a functional block diagram of general purpose computer hardware platforms to be used to implement a prepaid server and an SMSC as well as of a mobile station, which may implement various functionalities relating to communication and display of prepaid balance.

Each server 15 or 49 for example includes a data communication interface for packet data communication, and the servers implementing the SMSC 49 further include interfaces to SS7 links to the appropriate STPs. Each server also includes a central processing unit (CPU), in the form of one or more processors, for executing program instructions. The server platform also includes program storage and data storage for various data files to be processed and/or communicated by the particular server. The hardware elements operating systems and programming languages of such servers are conventional in nature, and it is presumed that those skilled in the art are adequately familiar therewith.

As shown by the above discussion, functions relating to the message delivery and management of prepaid account may be implemented on computers connected for data communication via the components of a mobile communication data network, operating as an SMSC and a prepaid server as shown in FIG. 1. Although special purpose devices may be used, such devices also may be implemented using one or more hardware platforms intended to represent a general class of data processing device commonly used to run 'server' programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. objects for the testing. The software code is executable by the general-purpose computer that functions as the server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for distinguishing a live actor from an automation, in essentially the manner performed in the implementations discussed and illustrated herein.

FIG. 2 provide functional block diagram illustrations of general purpose computer hardware platforms as may typically be used to implement a server. A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods outlined above may be embodied in programming, e.g. in the form of software, firmware, or microcode executable by a server or other programmable device. Such programming typically is carried on or otherwise embodied in a medium or media. Terms such as "machine-readable" medium and "computer-readable" medium as used herein generically refer to any tangible medium that participates in providing instructions and/or data to a programmable processor, such as the CPU or other processor of a server computer or user terminal device, for execution or other processing, including both storage media and communication media. A storage medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

FIG. 2 also illustrates a telephone or handset type implementation of the mobile station as typically used for voice and data communication. The handset embodiment of the mobile station 11 functions as a normal digital wireless telephone station. Hence, the station includes a microphone 61 for audio signal input and a speaker 63 for audio signal output. Microphone 61 and speaker 63 connect to voice coding and decoding circuitry (vocoder) 65. For PTT and other voice telephone calls, for example, the vocoder 65 provides two-way conversion between analog audio signals representing speech or other audio and digital samples at a compressed bit rate compatible with the digital protocol of the wireless telephone communications of network 40.

For digital wireless communications, the handset 11 also includes a digital transceiver (XCVR) 77. For example, the transceiver 77 could be a CDMA, TDMA or GSM unit, designed for cellular or PCS operation. Transceiver 77 provides two-way wireless communication of information, such as vocoded speech samples, although the transceiver may also provide communications for packetized digital message information. The transceiver also sends and receives a variety of signaling messages in support of the various services provided via the station 11 and the network 40. Transceiver 77 connects through RF transmit and receive amplifiers (not separately shown) to an antenna 49. The station 11 may include one or more additional transceivers (not shown) for operation in an analog mode or in accordance with an alternative digital standard.

The digital telephone handset 11 includes display 69 for displaying messages, one or more menus or lists (e.g. a contact list for Push To Talk (PTT)) and/or softkeys generated by the resident programming, call related information, dialed and calling party numbers, etc. Keypad 67 enables dialing digits for voice and/or data calls and generating selection inputs keyed by the user based on any displayed menu. Of note for purposes of this discussion, the keypad 67 and the display 69 provide at least a portion of the user interface for PTT communications.

A microprocessor 71 serves as the programmable controller in that it controls all operations of the mobile station 11. The microprocessor 71 is a programmable device. The mobile station 11 also includes memory 73 coupled to the microprocessor 71, for example, a flash type read only memory (ROM), for storing various software programs and mobile configuration settings, such as mobile identification number (MIN), etc. for execution or processing by the microprocessor 71. A non-volatile random access memory (RAM) 75 serves as a working memory during execution of programs. The memories also store data, such as telephone numbers and other data input by the user via the keypad 67 as well as received data (e.g. messages) for display.

Program memory 73 stores an operating system, device driver software, call processing software, and the like. For display of the remaining balance of prepaid account, the programming stored in the memory 73 will include Handset Balance Display (HBD) program 115 and other client programs 11L for network capabilities, and execution of the client program 115 by the microprocessor 71 enables the mobile station 11 to implement various aspects of the functions related to the HBD. In this example, the client program 11L is an application level program in the form of a micro-client specifically adapted for the circuit switched call processing and SMS messaging (although other data communications may be supported).

Of note for purposes of this discussion, the client program 11L also implements a flag. The service provider sets the state of the flag, to indicate whether or not the station 11 is that of a prepaid subscriber. The flag setting configures the client program 11L so that execution thereof by the controller (microprocessor) 71 will operate the station 11 in either the prepaid mode or the postpay mode. Although the service provider might use other mechanisms to set the state of the flag, in one example, the flag may be set in response to a command sent over-the-air, that is to say via the mobile communication network 40. When a subscriber signs up for prepaid service, the "prepaid flag" is set in the carrier's provisioning system to reflect the status of the subscriber as postpay or prepaid. This flag flows, by appropriate messaging, through the carrier's provisioning system to the prepaid management platform, the subscriber's home switch, and finally to the subscriber's resident prepaid client in the mobile station. The flag may be reset, e.g. from prepaid to postpay or from postpay to prepaid, in a similar manner at any time, for example, when the subscriber changes subscription arrangements with the service provider.

Figure 3:
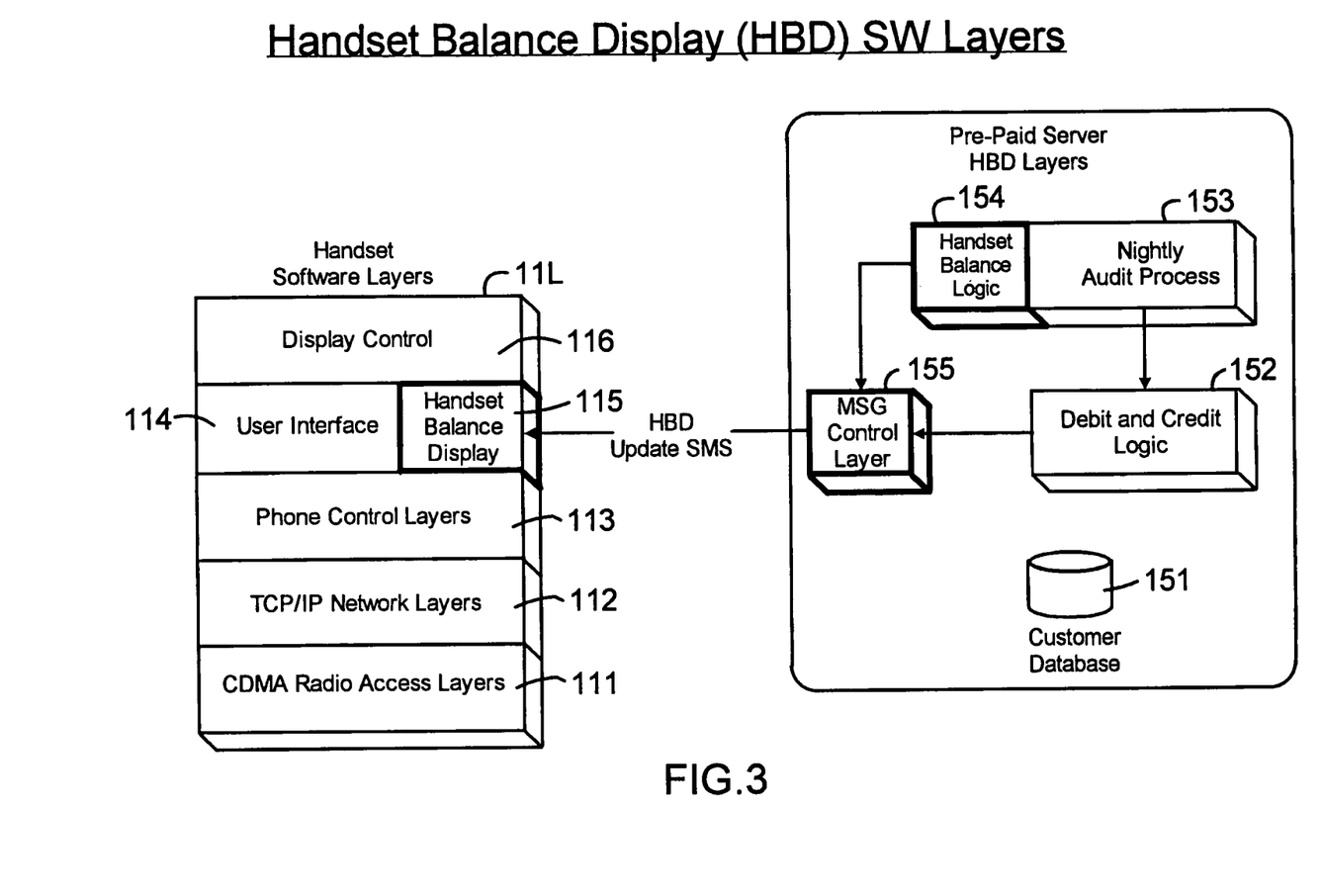
FIG. 3 is a block diagram to illustrate an exemplary software on the prepaid server and an exemplary application software launched in the mobile station to display remaining balance of the mobile station user's account.

FIG. 3 is a block diagram to illustrate an exemplary software platform implemented the prepaid server 15 and an exemplary application software of the HBD program 115 and the client program 11L launched in the mobile station 11 of FIG. 2, to facilitate a display of remaining prepaid account balance and/or remaining prepaid air time of the mobile station user's account and to synchronize the remainder information between the mobile station 11 and the prepaid server 15. The mobile station's application software 11L is embedded in the mobile station 11 and launched by an interactive implementation of a processor and a memory storing the application software inside the mobile station 11. An exemplary architecture of the application software 11L specifies a layered architecture based on the Open Systems Interconnection (OSI) model where each layer is required to encompass a certain functional split. An exemplary prepaid server 15 illustrates modules based on their functionalities related to managing prepaid accounts of customers.

While not shown, the mobile station's application 11L has a physical layer underlying the illustrated layered architecture, which needs to have the innate knowledge of the underlying hardware. CDMA radio access layer 111 manages movement of packets between the mobile station 11 and the network via the physical layer software and the actual mobile station hardware. The layer 111 moves received packets from a different communication device received via the network to a higher level layer, here TCP/IP layer 112 and moves the packets from the TCP/IP layer 112 to a different device via the network. The TCP/IP layer 112 ensures sending and obtaining packets across the single network, IP network. Phone control layer 113 governs mobile station's general functionalities such as receiving and making calls. User interface module 114 enables the mobile station user to input any interactive commands for any function performed in the mobile station 11. The user interface module 114 also supports a display function, which displays information related to operations of the mobile station 11 under the control of display control layer 116. For discussion of this example, the interface layer includes a balance display module 115 which enables the station to display messages indicating remaining balance of the user's prepaid account or remaining air time. The messages of remaining balance are originally made at the prepaid server 15 and sent to the mobile station via the RAN 40.

The example of the prepaid server 15 in FIG. 2 includes modules only dedicated to managing user's prepaid account, while, as described above, the actual prepaid server 15 implementation has modules to perform other functions, such as packet data communication with the network 34. The prepaid server 15 has a customer database 151, which stores each user's remaining balance and each user's record of date and time when the last message of remaining balance is sent to the user's mobile station 11. A debit and credit logic 152 monitors a balance affecting event such as voice or data call or recharge and initiates a delivery of a remaining balance message to the mobile station 11 when a balance affecting event occurs. A message control layer 155 is an interface to the SMSC 49 for sending messages via the network 40 to mobile stations. SMPP (Short Message Peer to Peer) Protocol is used to send messages to the SMSC 49. A Nightly Audit Process 155 performs account maintenance on every users' prepaid account such as debiting and crediting on the user's prepaid account periodically, for example every 24 hours. A Handset Balance Logic 154 retains the date/time of last message sent and determines whether or not another remaining balance message should be sent by comparing the time when last message is sent with the message retention time in the SMSC.

Figure 4:
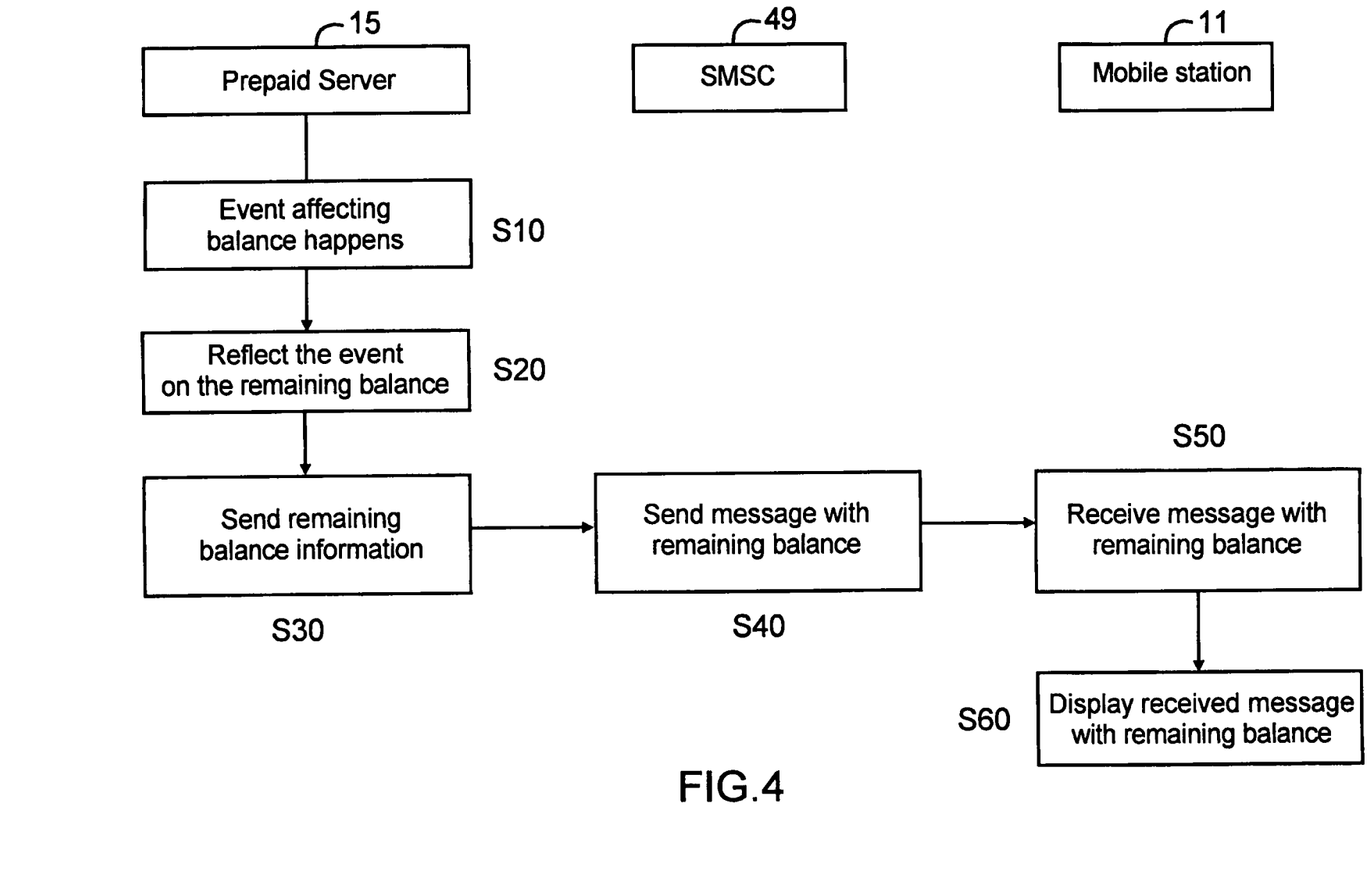
FIG. 4 is flow diagram of a process for displaying a message having remaining balance on a mobile station received from the prepaid server.

FIG. 4 is flow diagram of an event-responsive process for displaying message having remaining balance on a mobile station received from the prepaid server 15. The prepaid server 15 checks occurrence of an event affecting a mobile station user's prepaid account, such as deduction for calling air time or for sending an SMS message. (S10) Once the event affecting the user's prepaid account happens, the prepaid server 15 retrieves information regarding the balance of the corresponding user account from the customer's database and reflects the event on the remaining balance by cutting down the remaining balance. For example, if the prior balance was $100, the server may reduce the balance by the amount or charge corresponding to the event, for example by 0.10$ for one SMS message (new remaining balance is $99.90). (S20) The server stores the new balance, $99.90 in our example, in the subscriber's record in the customer database. The prepaid server 15 sends a message containing new remaining balance information reflecting the new event to the SMSC 49. (S30) The SMSC forms a SMS message including the remaining balance information and sends the SMS message to the corresponding mobile station 11 in which the event affecting the remaining balance occurs. (S40) While the SMS message is described as a way of notification of the remaining balance, voice message or any multimedia message form such as MMS can be an alternative way of delivering the remaining balance information to the mobile station 11. The mobile station 11 receives the message including the remaining balance (S50) and displays the message on the display to be viewed by the mobile station user. (S60)

Figure 5:
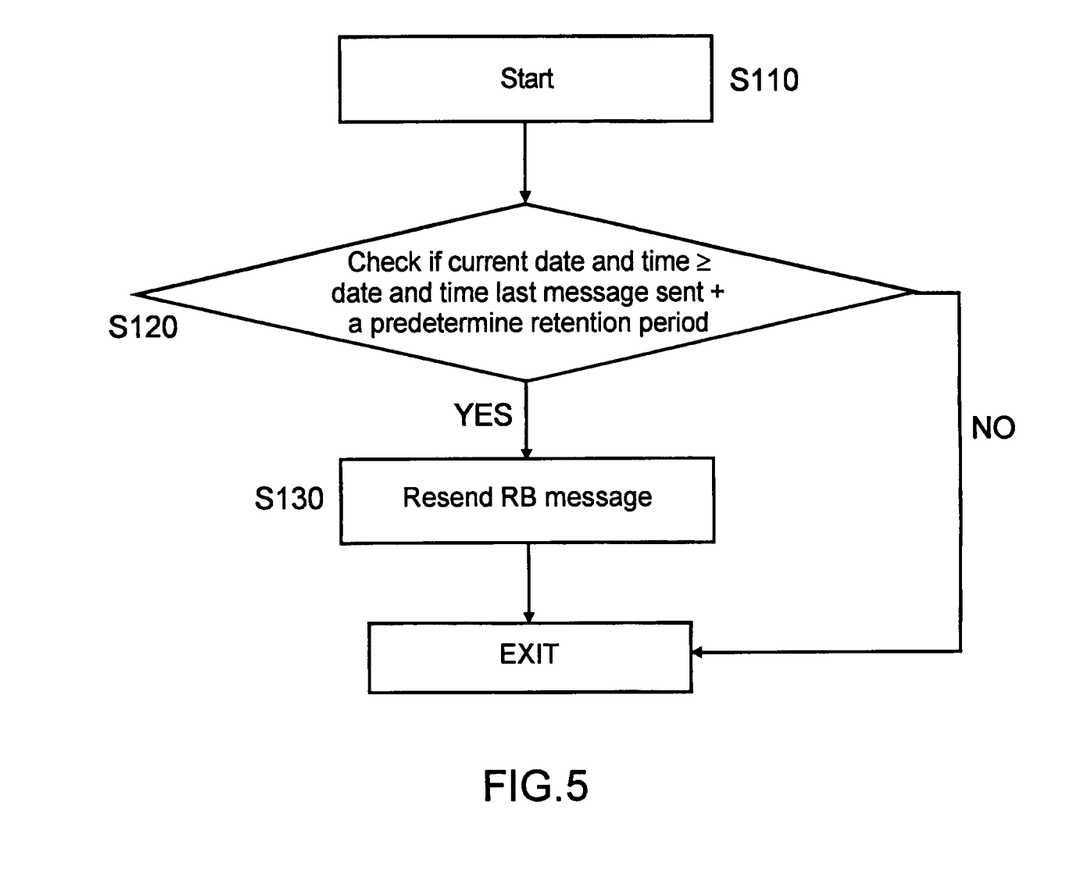
FIG. 5 is a flow diagram of a method to synchronize a real time remaining balance of a mobile station user's prepaid account stored in the prepaid server with the mobile station.

FIG. 5 is a flow diagram of a method to synchronize a real time remaining balance of a mobile station user's prepaid account stored in the prepaid server with the mobile station 11. When the mobile station 11 is powered off or is out of the mobile service coverage area, remaining balance of prepaid account displayed on the mobile station 11 is the one kept at the mobile station right before the mobile station is powered off or when the mobile station 11 was most recently in the mobile service coverage area. Thus, the remaining balance displayed on the mobile station may be out of date and, thus, does not reflect a real time and exact remaining balance information stored in the prepaid server 15. For synchronization of the remaining balance information stored in the prepaid server 15 with that of the mobile station 11, the prepaid server 15 periodically performs the process in FIG. 5. (S110) Alternatively, the prepaid server 15 may randomly perform the process in FIG. 5 whenever the mobile station returns to a normal operation, e.g. power on and entering into mobile service coverage area, from the powered off or mobile service uncovered areas.

The prepaid server 15 checks how long has been passed after the last message of remaining balance was sent to the mobile station and whether a predetermined retention time has elapsed after the last message of remaining balance was sent to the mobile station 11. (S120) The prepaid server 15 generates remaining balance information for each of mobile station users referring to the customer database 151 and sends the remaining balance information to the SMSC 49. The SMSC generates an SMS message having the remaining balance information and sends the SMS message to the mobile station 11 via the radio link between the SMSC 49 and the mobile station 11. The SMSC 49 tries to deliver the remaining balance message repeatedly despite failure of delivery, for a predetermined time; and the message is discarded after the maximum retention time elapses.

As described above, the prepaid server 15 retains the date and time of the last created remaining balance information and, thus, knows the retention time of the remaining balance message created by the SMSC 49 without reference to the SMSC 49. The retention time of the remaining balance message represents how much outdated the remaining balance kept at the mobile station is. The more the retention time of the remaining balance message last sent, the less likely it will be that the remaining balance is kept at the mobile station 11. Typically, the server uses a time limit or threshold the same as or somewhat longer than the maximum limit for message retention implemented by the SMSC 49. Thus, if time has elapsed more than a predetermined period from the time the last message was sent to the mobile station 11, the prepaid server 15 decides to send another remaining balance message to the mobile station 11, whether or not the SMSC 49 has sent an earlier remaining balance message to the mobile station 11 during the predetermined period. (S130) Typically, the new message indicates the same account balance as in the last prior message, i.e. that produced by the last balance changing event that caused the server to send the last prior message.

The elapse of the more than the predetermined period may indicate that the previous remaining balance message has not been delivered to the mobile station 11 and there exists a disparity between the remaining balance displayed at the mobile station and the remaining balance stored in the prepaid server 15. If the time has not elapsed more than the predetermined period from the time the last message was sent to the mobile station 11, the prepaid server 15 does not take any action for sending a new remaining balance message. The predetermined period can be set as to optimize the needs for the synchronization of remaining balance between the mobile station and the prepaid server against traffic load for delivery of remaining balance messages to mobile station. The method synchronizes the remaining balance information kept at the mobile station with that stored in the prepaid server independent of the state of delivery of the remaining balance message thereby eliminating the need for the prepaid server 15 to check the SMCS 49 about the state of delivery of the remaining balance message.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

SMPP: Short Message Peer to Peer
SMSC: Short Message Service Center
STP: Signal Transfer Points
OSI: Open Systems Interconnection
CDMA: Code Divisional Multiple Access
RAN: Radio Access Network
PSTN: Public Switched Telephone Network
SMS: Short Message Service
HBD: Handset Balance Display
HLR: Home Location Register
VLR: Visitor Location Register
PDA: Portable Digital Assistant
BTS: Base Transceiver System
MTSO: Mobile Telephone Switching Offices
MMSC: Multimedia Message Service Center
BSC: Base Station Controller
IP: Internet Protocol
CPU: Central Processing Unit

What is claimed is:

1. A method for synchronizing a prepaid account balance of a mobile station user on the mobile station with a prepaid account balance and a balance expiration date stored in a prepaid server, the mobile station being configured for receiving one or more messages from the prepaid server via a message service center (MSC) indicating the prepaid account balance and the balance expiration date generated by a prepaid server via a communication link established through a wireless network system, the method comprising steps of:

(a) retaining by the prepaid server a time at which a last preceding message indicating the prepaid account balance was generated and sent by the prepaid server to the MSC for delivery to the mobile station;

(b) determining by the prepaid server an amount of time which has elapsed after the retained time at which the last message indicating the prepaid account balance was generated and sent by the prepaid server; and (c) generating and sending by the prepaid server, independent of a state of delivery of the last message, a new message indicating the prepaid account balance, to the MSC for delivery to the mobile station, when a predetermined time has elapsed after the last message indicating the prepaid account balance was generated and sent by the prepaid server, wherein the predetermined time is equal to or longer than a retention time of messages at the MSC, the retention time indicating a time in which the MSC will discard the messages when the messages have not been successfully delivered to the mobile station.

2. The method of claim 1, wherein the steps (a), (b) and (c) are performed periodically by the prepaid server.

3. The method of claim 1, wherein the steps (a), (b) and (c) are performed when the mobile station is powered on from power off state or the mobile station moves to a service coverage area from a non-service coverage area.

4. The method of claim 1, further comprising a step of:

(d) displaying the new message showing the prepaid account balance and the balance expiration date on the mobile station upon receiving the new message.

5. The method of claim 1, wherein the last message indicating the prepaid account balance is generated when an event affecting the prepaid account occurs, and each of the last message and the new message indicates the prepaid account balance when the event occurred.

6. The method of claim 1, wherein the last message and the new message further indicate the balance expiration date of the mobile station user stored in the prepaid server.

7. The method of claim 1, wherein the new message generated and sent when the predetermined time has elapsed indicates the same prepaid account balance as the last message indicating the prepaid account balance.

8. A network system for notifying a mobile station of a prepaid account balance of a user of the mobile station, the system comprising:

at least one network element for establishing a communication link with the mobile station to provide a mobile communication service;

a message service center (MSC) for receiving and sending one or more messages indicating a prepaid account balance of the mobile station user to the mobile station via the established communication link with the mobile station; and a prepaid server for managing prepaid accounts of mobile stations users, for retaining a time at which a last preceding message indicating the prepaid account balance of the mobile station user was sent, and for sending, independent of a state of delivery of the last message, a new message indicating the prepaid account balance of the mobile station user through the MSC when a predetermined time has elapsed after the retained time at which the last message indicating the prepaid account balance has been sent to the mobile station, wherein the predetermined time is equal to or longer than a retention time of messages at the MSC, the retention time indicating a time in which the MSC will discard the messages when the messages have not been successfully delivered to the mobile station.

9. The system of claim 8, wherein the prepaid server includes:

a customer database for storing prepaid account data of mobile station users;

a message control interface for controlling messages generated at the message center; and a processor to perform operations including:
  checking how long has elapsed after the retained time at which the last message indicating the prepaid account balance was sent to the mobile station;
  deciding whether the predetermined time has elapsed after the retained time at which the last message indicating the prepaid account balance was sent to the mobile station; and
  deciding to generate the new message indicating the prepaid account balance of the mobile station user when the predetermined time has elapsed after the retained time at which the last message indicating the prepaid account balance was sent to the mobile station.

10. The system of claim 9, wherein the processor performs the operations periodically.

11. The system of claim 9, wherein the processor performs the operations when the mobile station is powered on or returns to a service coverage area from a non-service coverage area.

12. The system of claim 8, wherein the message center discards the last message showing prepaid account balance upon failure to deliver the last message to the mobile station within the predetermined time.

13. The system of claim 8, wherein
  the last message indicating the prepaid account balance is generated when an event affecting the prepaid account occurs, and each of the last message and the new message indicates the prepaid account balance when the event occurred.

14. The system of claim 8, wherein the last message and the new message further indicate the balance expiration date of the mobile station user stored in the prepaid server.

15. The system of claim 8, wherein the new message sent by the prepaid server when the predetermined time has elapsed indicates the same prepaid account balance as the last message indicating the prepaid account balance.

16. A prepaid server for providing prepaid account balance information to mobile stations, the mobile stations receiving messages showing the prepaid account information from a mobile communication service network to which the prepaid server is connected to a communication link, the prepaid server comprises:
  a customer database for storing prepaid account data of the mobile station users;
  a message control interface for controlling messages indicating the prepaid account balance information generated at the mobile communication service network; and
  a microprocessor to perform operations including:
    retaining a time at which a last preceding message indicating the prepaid account balance for one of the user's account was generated by the prepaid server;
    checking how long has elapsed after the retained time at which the last message indicating the prepaid account balance for one of the user's account was generated by the prepaid server for the one user's mobile station;
    deciding whether a predetermined time has elapsed after said retained time at which the last message indicating the prepaid account balance was generated by the prepaid server;
    deciding to generate a new message showing the prepaid account balance for the one user's account when the predetermined time has elapsed after the retained time at which the last message indicating the prepaid account balance was generated by the prepaid server; and
    sending, independent of a state of delivery of the last message, the new message to a message service center (MSC) for delivery to the one user's mobile station,
  wherein the predetermined time is equal to or longer than a retention time of messages at the MSC, the retention time indicating a time in which the MSC will discard the messages when the messages have not been successfully delivered to the mobile station.

17. The prepaid server of claim 16, wherein the prepaid server manages debiting and crediting of the prepaid account for each of the mobile stations when a predetermined event affecting the prepaid account arises.

18. The prepaid server of claim 17, wherein the prepaid server decides to generate a message showing the prepaid account balance information when the predetermined event arises.

19. The prepaid server of claim 16, wherein the new message generated by the microprocessor when the predetermined time has elapsed indicates the same prepaid account balance as the last message indicating the prepaid account balance.

20. A processor-readable medium tangibly embodying a set of processor-executable instructions, wherein execution of the instructions causes a processor of a prepaid server to perform functions comprising:
  retaining a time at which a last preceding message indicating a prepaid account balance of a mobile station was generated by the prepaid server;
  checking how long has elapsed after the retained time at which the last message indicating the prepaid account balance of the mobile station was generated by the prepaid server, the prepaid account balance representing an available account balance to be used by the mobile station, the last message being sent to a message service center (MSC) for delivery to the mobile station via a wireless communication network;
  deciding whether a predetermined time has elapsed after the retained time at which the last message indicating the prepaid account balance was generated by the prepaid server; and
  deciding to generate, independent of a state of delivery of the last message, a new message showing the prepaid account balance of the mobile station user when the predetermined time has elapsed after the retained time at which the last message indicating the prepaid account balance was generated by the prepaid server,
  wherein the predetermined time is equal to or longer than a retention time of messages at the MSC, the retention time indicating a time in which the MSC will discard the messages when the messages have not been successfully delivered to the mobile station.

21. The processor-readable medium of claim 20, wherein the new message generated when the predetermined time has elapsed indicates the same prepaid account balance as the last message indicating the prepaid account balance.

* * * * *